United States Patent [19]

Markessini et al.

[11] Patent Number: 4,886,854

[45] Date of Patent: Dec. 12, 1989

[54] SUBSTITUTE FOR AMINO AND PHENOLIC RESINS

[75] Inventors: Efthalia V. Markessini, Salonica, Greece; Andrew C. Markessini, Bad Munder, Fed. Rep. of Germany

[73] Assignee: ENIGMA, NV, Curacao, Netherlands Antilles

[21] Appl. No.: 58,905

[22] Filed: Jun. 5, 1987

[30] Foreign Application Priority Data

Jun. 6, 1986 [GB] United Kingdom ................. 8613791
Jan. 23, 1987 [GB] United Kingdom ................. 8701518
Apr. 28, 1987 [GB] United Kingdom ................. 8710016

[51] Int. Cl.$^4$ .......................... C08L 97/02; B29J 5/00
[52] U.S. Cl. ........................................ 524/14; 524/13; 428/537.1
[58] Field of Search ..................... 524/27, 33, 34, 47, 524/48, 49, 50, 51, 55, 56, 57, 58, 72, 74, 13, 14; 428/537.1

[56] References Cited

U.S. PATENT DOCUMENTS 4,339,361 7/1982 MacPherson et al. ............... 527/303

FOREIGN PATENT DOCUMENTS

| 0041745 | 12/1981 | Italy . |
| 506553 | 5/1939 | United Kingdom . |
| 624437 | 6/1946 | United Kingdom . |
| 634368 | 3/1950 | United Kingdom . |
| 824108 | 11/1959 | United Kingdom . |
| 929004 | 6/1963 | United Kingdom . |
| 963462 | 7/1964 | United Kingdom . |
| 1038077 | 8/1966 | United Kingdom . |
| 1293744 | 10/1972 | United Kingdom . |
| 1309606 | 3/1973 | United Kingdom . |
| 1601751 | 11/1981 | United Kingdom . |
| 2136008A | 9/1984 | United Kingdom . |

*Primary Examiner*—Morton Foelak
*Assistant Examiner*—Nathan M. Nutter
*Attorney, Agent, or Firm*—Limbach, Limbach & Sutton

[57] ABSTRACT

A substitute for amino and phenolic resins is disclosed. It is used in the polycondensation of such resins based on formaldehyde for bonding water penetrable cellulosic particles. The substitute comprises an aqueous solution of (a) either at least one aldehyde together with at least one amide and/or together with at least one phenol, or a non-resinous condensation product of formaldehyde and urea, and (b) a sugar or a sugar derivative or their byproducts or a starch or its degradation products or a mixture thereof, and/or (c) a raw and/or treated lignosulfonate.

This substitute also reduces the free formaldehyde of the resulting board without impairing the other properties thereof.

6 Claims, No Drawings

SUBSTITUTE FOR AMINO AND PHENOLIC RESINS

TECHNICAL FIELD

Background

Substitutes so far known in the art to substitute resin have not succeeded in substituting such high levels of resin by using lower amounts of the substitute and reducing simultaneously the free formaldehyde of the boards, without imparting any loss in bonding strength, without requiring any extra steps in the production, without changing the curing rate of the production, without causing any problems to the boilers when burning particleboard sander dust or edges from cutting saws and without reducing the tack of the resin mixture.

In particular, the known substituents are lignosulfonates, sodium chloride or mixtures of formaldehyde with urea and sodium chloride. It is well known that lignosulfonates may not be used for quantities higher than 10%; otherwise, board properties will be reduced.

It is also known that the addition of halide salt alone succeeds in substituting part of the resin with the following limitations:

High substitutions, higher than 6 to 8%, may not be obtained, otherwise the board properties will deteriorate.

Substitution is obtained in ratios 1:1, while in the case of the substitute according to the present invention it is 1.1 to 2.0:1.

When particleboard sander dust or edges from cutting saws are burnt in boilers, the latter are plugged within a few hours.

Tack is reduced when sodium chloride is added to the resin mixtures.

When mixtures of sodium chloride with urea and formaldehyde are used the following shortcomings are present:

The presence of salt in the mixture causes severe problems in the boilers when sander dust or cutting saw edges of boards are burnt. That is caused because the presence of salt reduces the melting point of the mixture and as a result a molten mass deposits in the boiler forming a glass like deposit which adheres on the boiler thus plugging it.

The other shortcoming of this product is the fact that tack is severely reduced, thus making it difficult to use in the plywood industry where there is a pre-press and in particleboard plants where a multi opening press is present requiring green strength of the mat.

The product according to the present invention overcomes all of the above shortcomings.

The substitute according to the present invention provides yet another advantage. Apart from substituting up to 30% of the resin by adding only 50 to 90% of the resin solids substituted, and reducing the free formaldehyde of boards, it reduces also the free formaldehyde in the production hall where workers are exposed to formaldehyde fumes.

The present invention relates to a substitute for amino and phenolic resins in the polycondensation of such resins based on formaldehyde for bonding water penetrable cellulosic particles thus allowing lower amounts of resin solids to be used while at the same time reducing the free formaldehyde of the resulting board without imparting any loss in bonding strength, without requiring any extra steps in the production, without changing the curing rate of the production, without causing any problems to the boilers when burning particleboard sander dust or edges from cutting saws and without reducing the tack properties of the resin mixture.

SUMMARY OF THE INVENTION

The said substitute is comprised mainly of a solution of:

(a) either an aldehyde together with an amide or together with a phenol, or a non-resinous condensation product of formaldehyde and urea, and (b) a sugar or a sugar derivative or their byproducts or a starch or a mixture thereof, and/or (c) a raw and/or treated lignosulfonate or similar products.

The aldehyde is preferably formaldehyde, for example in the form of paraformaldehyde, or acetaldehyde. The amide is preferably mainly urea or thiourea or their homologues or melamine, benzoguanamine or dicyandiamide or their homologues. The phenol is preferably phenol itself or resorcinol.

Among the sugars, sugar derivatives, their byproducts and mixtures thereof, molasses, dextrose, glucose, fructose or sucrose or mixtures thereof such as corn syrup are most preferred. Among the starches, wheat starch, modified starches, dextrin and the like are interesting.

Examples of raw lignosulfonates are black liquor and similar products, and example of treated lignosulfonates are sodium, calcium and ammonium lignosulfonate.

The substitute of the invention preferably contains 40 to 52% by weight of water.

The weight ratio of (a) to (b) and/or (c) is preferably 0.1 to 50.0:1, most preferably 1.0 to 15.0:1. The combination of (a) with (b) and/or (c) presents a synergistic behavior. If the single components are added alone to the resin they don not give good boards, but if they are added in combination, they exhibit an improvement in the board properties obtained. The substitute according to the present invention (calculated as 100% solids) may substitute as much as 30% of the resin solids used. Said substitute is not added in quantities equal to the quantities substituted. It is added in quantities from 50 to 90% of the amount of resin substituted (calculations referred to by weight and referring to all products as 100% solids).

The substitute according to the present invention may therefore, because of its synergistic behavior, substitute the resin in quantities from 110% up to 200% of its own weight. When added to lower amounts, e.g., up to 15%, there is a considerable increase in the properties of the end product. When added to higher levels, i.e., up to 30%, no difference is imparted to the properties of the end product but the free formaldehyde is considerably reduced and the amount of resin saved is considerably increased.

DETAILED DESCRIPTION OF THE INVENTION

Bonding is effected by curing the resin mixture at elevated temperatures and pressures according to the methods well known in the art. The substitute may be used in all types of products where amino and phenolic resins are used for bonding lignocellulosic products, whether these are wood particles for particleboard production using a flat press, or a calender or wood veneers such as in plywood production.

It is very interesting to note that the product has also good tack. This property otherwise called "green strength" is desired in some types of particleboard plants, especially the plants with multi opening press and in plywood factories, especially those having a pre-press.

The quality of boards produced was controlled weekly for a period of six months and no reduction in the properties was observed. This proves that no polymer degradation occurs and that the ageing properties of the boards are comparable to the ones normally produced.

The substitute of the invention can be prepared by plain mixing of the components. In order to obtain an acceptable shelf-life of the substitute, a base is preferably added to adjust the pH to a value in the range of 6 to 14.

The following Examples illustrate the invention and are not intended as limitations.

EXAMPLE 1

Three samples were prepared according to the following formulations:

|  | Sample No. | | |
| --- | --- | --- | --- |
|  | 1 | 2 | 3 |
|  | parts by weight | | |
| Formaldehyde 100% | 185 | — | 133 |
| Urea 100% | 370 | — | 266 |
| Molasses 100% | — | 555 | 156 |
| Water | 445 | 445 | 445 |
| Total | 1000 | 1000 | 1000 |

The above mentioned samples were prepared by plain mixing at room temperature until the solids were completely dissolved. The pH of the final products was adjusted to 7.5 to 8.0.

Glue formulations were then prepared as follows:

|  | Glue formulation No. | | | |
| --- | --- | --- | --- | --- |
|  | 0 | 1 | 2 | 3 |
|  | parts by weight | | | |
| Urea formaldehyde resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20%) | 7.1 | 7.1 | 7.1 | 7.1 |

No. 0: Glue formulation is the blank and does not include any of the above mentioned samples.
No. 1: Glue formulation includes sample 1, whereby only formaldehyde and urea are included.
No. 2: Glue formulation includes sample 2 whereby only molasses are included.
No. 2: Glue formulation includes sample 3 whereby all three ingredients are added, namely, formaldehyde, urea and molasses. Sample 3 represents the product according to the present invention.

These glue formulations were used separately to spray a constant quantity of dried wood chips.

The sprayed wood chips were then formed into a mat having a normal thickness of 16 mm. These mats were then introduced into a hot press and boards were pressed at the following conditions:

| Press temperature | 200° C. |
| --- | --- |
| Press time | 9 sec/mm |
| Pressure | 33 kp/cm² |

Boards were then tested and the results are reported in the following table.

|  | Glue formulation No. | | | |
| --- | --- | --- | --- | --- |
|  | 0 | 1 | 2 | 3 |
| Density (kg/m³) | 582 | 591 | 583 | 582 |
| Thickness (mm) | 15.4 | 15.2 | 15.5 | 15.4 |
| Internal bond (kg/cm²) | 7.1 | 6.5 | 5.0 | 7.2 |
| 2 hrs thickness swelling (%) | 11.1 | 11.3 | 17.5 | 12.1 |
| 24 hrs thickness swelling (%) | 20.3 | 22.5 | 30.3 | 22.3 |
| Free formaldehyde (mg/100 g dry board) | 24.1 | 18.3 | 21.8 | 18.7 |
| Moisture content (%) | 5.5 | 5.0 | 5.3 | 5.0 |

It can be noticed from the above mentioned table that while all three samples reduce the free formaldehyde of boards, only sample 3 including the components according to the present invention gives boards equivalent to the blank, without deterioration of the board properties.

EXAMPLE 2

This example proves the synergistic behavior existing between formaldehyde, urea and lignosulfonates.

For this purpose the following samples were prepared:

|  | Sample No. | | |
| --- | --- | --- | --- |
|  | 1 | 2 | 3 |
|  | parts by weight | | |
| Formaldehyde (100%) | 100 | — | 133 |
| Urea (100)% | 370 | — | 266 |
| Calcium lignosulfonate (100%) | — | 555 | 156 |
| Water | 445 | 445 | 445 |
| Total | 1000 | 1000 | 1000 |

The above mentioned samples were prepared by plain mixing at room temperature until the solids were completely dissolved. The pH of the final products was adjusted to 7.5 to 8.0.

Glue formulations were then prepared as follows:

|  | Glue formulation No. | | | |
| --- | --- | --- | --- | --- |
|  | 0 | 1 | 2 | 3 |
|  | parts by weight | | | |
| Urea formaldehyde resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20%) | 7.1 | 7.1 | 7.1 | 7.1 |

These glue formulations were used separately to spray a constant quantity of dried wood chips.

The sprayed wood chips were then formed into a mat having a nominal thickness of 16 mm. These mats were then introduced into a hot press and boards were pressed at the following conditions:

| Press temperature | 200° C. |
| --- | --- |
| Press time | 9 sec/mm |
| Pressure | 33 kp/cm² |

Boards were then tested and the results are reported in the following table:

|  | Glue formulation No. | | | |
| --- | --- | --- | --- | --- |
|  | 0 | 1 | 2 | 3 |
| Density (kg/m$^3$) | 580 | 591 | 590 | 584 |
| Thickness (mm) | 15.5 | 15.2 | 15.0 | 15.1 |
| Internal bond (kg/cm$^2$) | 7.0 | 6.3 | 5.4 | 6.9 |
| 2 hrs thickness swelling (%) | 11.2 | 11.3 | 17.8 | 11.8 |
| 24 hrs thickness swelling (%) | 20.6 | 22.5 | 29.5 | 23.8 |
| Free formaldehyde (mg/100 g dry board) | 23.9 | 19.8 | 18.5 | 17.8 |
| Moisture content (%) | 5.8 | 5.0 | 4.5 | 4.8 |

It will be noticed from the above mentioned figures that boards produced with plain lignosulfonates, sample 2, have the worst results. Boards obtained with all three components according to our present invention, sample 3, have the best results. Actually boards of sample 3 are equivalent to the blank, 0, which is the resin mixture without any substitute, while giving at the same time a reduction in the free formaldehyde of the boards.

EXAMPLE 3

In this example two samples are illustrated whereby the ratio of formaldehyde to urea is different from the one used in the previous examples. Also the weight ratio between components (a) and (b) is different from the one of examples 1 and 2.

The following samples were prepared:

|  | Sample No. | |
| --- | --- | --- |
|  | 1 | 2 |
|  | parts by weight | |
| Formaldehyde (100)% | 133 | 133 |
| Urea (100%) | 177 | 177 |
| Molasses (100%) | 156 | — |
| Dextrin glue (100%) | 30 | — |
| Calcium lignosulfonate (100%) | — | 186 |
| Water | 504 | 504 |
| Total | 1000 | 1000 |

The above mentioned samples were prepared by plain mixing at room temperature until the solids were completely dissolved. The pH of the final products was adjusted to 7.5 to 8.0.

Glue formulations were then prepared as follows:

|  | Glue formulation No. | | |
| --- | --- | --- | --- |
|  | 0 | 1 | 2 |
|  | parts by weight | | |
| Urea formaldehyde resin (65% solids) | 108.9 | 87.1 | 87.1 |
| Water | 13.8 | 13.8 | 13.8 |
| Sample 1 | — | 21.8 | — |
| Sample 2 | — | — | 21.8 |
| Ammonium chloride (20%) | 7.1 | 7.1 | 7.1 |

These glue formulations were used separately to spray a constant quantity of dried wood chips.

The sprayed wood chips were then formed into a mat having a nominal thickness of 16 mm. These mats were then introduced into a hot press and boards were pressed at the following conditions:

| Press temperature | 200° C. |
| --- | --- |
| Press time | 9 sec/mm |
| Pressure | 33 kp/cm$^2$ |

Boards were then tested and the results are reported in the following table:

|  | Glue formulation No. | | |
| --- | --- | --- | --- |
|  | 0 | 1 | 2 |
| Density (kg/m$^3$) | 573 | 595 | 587 |
| Thickness (mm) | 15.1 | 15.4 | 15.2 |
| Internal bond (kg/cm$^2$) | 8.1 | 8.7 | 8.9 |
| 2 hrs thickness swelling (%) | 10.5 | 10.0 | 9.8 |
| 24 hrs thickness swelling (%) | 19.9 | 19.3 | 18.7 |
| Free formaldehyde (mg/100 g dry board) | 46.6 | 39.2 | 34.3 |
| Moisture content (%) | 5.9 | 5.3 | 5.0 |

It can be noticed from the above mentioned table that samples 1 and 2 including the substitute according to the present invention give boards equivalent to the blank, sample 0, while giving a significant free formaldehyde reduction and resin saving.

EXAMPLE 4

This is a laboratory test for plywood using a phenolic resin.

The following samples were prepared:

|  | Sample No. | |
| --- | --- | --- |
|  | 1 | 2 |
|  | parts by weight | |
| Phenol (100%) | 180 | 200 |
| Formaldehyde (100%) | 80 | 100 |
| Molasses (100%) | 120 | 180 |
| Ammonium lignosulfonate (100%) | 200 | — |
| Water | 420 | 520 |
| Total | 1000 | 1000 |

The samples were prepared by plain mixing at room temperature until the solids were completely dissolved. The pH of the final products was brought to 10.0 by means of addition of sodium hydroxide.

These samples were used in a glue formulation as follows:

|  | Glue formulation No. | | |
| --- | --- | --- | --- |
|  | 0 | 1 | 2 |
|  | parts by weight | | |
| Phenol formaldehyde glue (100%) | 100 | 80 | 80 |
| Hardener (calcium carbonate: wheat flour - weight ratio 50:50) | 60 | 60 | 60 |
| Water | 107 | 90 | 90 |
| Sample 1 | — | 30.77 | — |
| Sample 2 | — | — | 30.77 |
| Wheat flour | — | — | 10 |
| Total | 267 | 260.77 | 270.77 |
| Viscosity (mPa.s) | 1200 | 1300 | 1100 |

The above mentioned glue formulations were used to spread both sides of the core veneer for 3 ply boards.

Boards were then introduced in a cold press where they were pressed under the following conditions:

| Press time | 8 minutes |
| --- | --- |
| Pressure | 10 kp/cm$^2$ |

All boards gave very good tack properties.

They were then pressed in a hot press under the following conditions:

| | |
|---|---|
| Press temperature | 130° C. |
| Press time | 3.5 minutes |
| Pressure | 12 kp/cm² |

These boards were tested as follows:
They were immersed for 24 hours in water at 60° C. After this they were introduced in water at 20° C. for one hour and then the knife test was carried out.
Results were as follows:

| Glue formulation No. | 0 | 1 | 2 |
|---|---|---|---|
| Grading | 10/10 | 10/10 | 10/10 |

The knife test is carried out as follows:
Plywood samples are placed in water under pressure for 30 minutes and then in vacuum for another 30 minutes. Samples are then scraped with a knife on the surface until the top veneer comes off and the core shows up. The grading depends on the amount of fibers showing in the core after the top veneer was scraped off.

When gluing is satisfactory, the surface that appears after scraping with the knife must still be covered with fibers. When it is completely covered with fibers grading is 10 (excellent). As more clean spots appear and less fibers, grading is diminished. A grading of 8 is still satisfactory, and it means that the surface is mainly covered with fibers with only a few clean spots appearing. Lower grading is unsatisfactory.

EXAMPLE 5

Two samples were prepared according to the following formulations:

| | Sample No. | |
|---|---|---|
| | 1 | 2 |
| | parts by weight | |
| Formaldehyde (100%) | 100 | 140 |
| Urea (100%) | 140 | 190 |
| Melamine (100%) | 100 | 110 |
| Molasses (100%) | — | 110 |
| Ammonium lignosulfonate (100%) | 150 | — |
| Water | 510 | 450 |
| Total | 1000 | 1000 |

The above mentioned samples were prepared by plain mixing at 25° to 30° C. until the solids were completely dissolved. The pH of the final products was adjusted to 8.5 to 10.0.
Glue formulations were then prepared as follows:

| | Glue formulation No. | | |
|---|---|---|---|
| | 0 | 1 | 2 |
| | parts by weight | | |
| Kauramin 535 (63% solids) | 108 | 92 | 92 |
| Hardener (1) | 14.8 | 14.8 | 14.8 |
| Formic acid (20%) | 4 | 4 | 4 |
| Paraffin emulsion | 5.5 | 5.5 | 5.5 |
| Sample 1 | — | 16 | — |
| Sample 2 | — | — | 16 |
| Water | 13 | 13 | 13 |

| (1) The Hardener solution was: | | |
|---|---|---|
| | hot water | 462 |
| | urea | 384 |
| | ammonium chloride | 154 |
| | TOTAL | 1000 |

These glue formulations were used separately to spray a constant quantity of dried wood chips with 12% dry glue/dry wood.
The sprayed wood chips were then formed into a mat having a normal thickness of 16 mm. These mats were then introduced into a hot press and boards were pressed at the following conditions:

| | |
|---|---|
| Press temperature | 200° C. |
| Press time | 10 sec/mm |
| Pressure | 35 kp/cm² |

Boards were then tested and the results are reported in the following table.

| | Glue formulation No. | | |
|---|---|---|---|
| | 0 | 1 | 2 |
| Density (kg/m³) | 686 | 687 | 685 |
| Thickness (mm) | 15.9 | 15.7 | 15.7 |
| Internal bond (kg/cm²) | 6.6 | 6.5 | 6.4 |
| 2 hrs thickness swelling (%) | 3.2 | 3.2 | 2.9 |
| 24 hrs thickness swelling (%) | 9.2 | 9.0 | 8.5 |
| V-100 (kg/cm²) | 1.6 | 1.5 | 1.6 |

The V-100 test is carried out as follows:
The samples to be tested are placed in water at 20°±5° C. This water is warmed up in 1 to 2 hours to 100° C. The water temperature is kept at 100° C. for 2 hours. It is important that there is a space of at least 15 mm on all sides of every sample so as to make sure that water is freely introduced in the samples. The samples are then introduced for at least 1 hour in a refrigerator at 2°±5° C. Water is then allowed to drip and the wet samples are tested again for internal bond.

EXAMPLE 6

The following example will illustrate the fact that products according to our present invention may be produced by means of a variety of raw materials.
Samples were prepared according to the following formulations:

| | Sample No. | | |
|---|---|---|---|
| | 1 | 2 | 3 |
| | parts by weight | | |
| Paraformaldehyde | 350 | — | — |
| Precondensate 80% (1) | — | 50 | — |
| Acetaldehyde 100% | — | — | 130 |
| Urea 100% | 150 | 12 | 200 |
| Sucrose 100% | 50 | 100 | — |
| Molasses 100% | 50 | 150 | — |
| Ammonium lignosulfate 100% | — | 230 | 210 |
| Dextrin 100% | — | 40 | — |
| Water | 400 | 418 | 460 |

(1) Precondensate containing 53 parts by weight of formaldehyde, 27 parts by weight of urea and 20 parts by weight of water The above mentioned samples were prepared by plain mixing until the solids were completely dissolved. The pH of the final products was adjusted to 7.5 to 8.0.
Glue formulations were the prepared as follows:

| | Glue formulations No. | | | |
|---|---|---|---|---|
| | 0 | 1 | 2 | 3 |
| | parts by weight | | | |
| Urea formaldehyde resin (65% solids) | 108.9 | 93 | 93 | 93 |
| Water | 13.8 | 13.8 | 13.8 | 13.8 |

|  | Glue formulations No. | | | |
| --- | --- | --- | --- | --- |
|  | 0 | 1 | 2 | 3 |
|  |  | parts by weight | | |
| Sample 1 | — | 15.9 | — | — |
| Sample 2 | — | — | 15.9 | — |
| Sample 3 | — | — | — | 15.9 |
| Ammonium chloride (20%) | 7.1 | 7.1 | 7.1 | 7.1 |

These glue formulations were used separately to spray a constant quantity of dried wood chips.

The sprayed wood chips were then formed into a mat having a normal thickness of 16 mm. These mats were then introduced into a hot press and boards were pressed at the following conditions:

| Press temperature | 200° C. |
| --- | --- |
| Press time | 9 sec/mm |
| Pressure | 33 kp/cm² |

Boards were then tested and the results are reported in the following table:

|  | Glue formulation No. | | | |
| --- | --- | --- | --- | --- |
|  | 0 | 1 | 2 | 3 |
| Density (kg/m³) | 600 | 610 | 590 | 580 |
| Thickness (mm) | 15.8 | 15.9 | 15.7 | 15.6 |
| Internal bond (kg/cm²) | 6.8 | 6.9 | 7.1 | 6.5 |
| 2 hrs thickness swelling (%) | 10.5 | 10.3 | 10.1 | 9.9 |
| 24 hrs thickness swelling (%) | 20.1 | 19.5 | 19.9 | 20.3 |
| Free formaldehyde | 22.3 | 18.0 | 16.2 | 17.1 |
| Moisture content (%) | 5.7 | 5.3 | 5.5 | 5.6 |

Boards obtained with all glue formulations are equivalent.

EXAMPLE 7

In this example four samples were prepared according to the following formulations:

|  | Sample No. | | | |
| --- | --- | --- | --- | --- |
|  | 1 | 2 | 3 | 4 |
|  |  | parts by weight | | |
| Formaldehyde | 100 | 100 | 100 | 100 |
| Resorcinol | — | 50 | — | — |
| Thiourea | 50 | — | — | — |
| Urea | 140 | 150 | 70 | 70 |
| Benzoguanamine | — | — | 80 | — |
| Dicyandiamide | — | — | — | 80 |
| Wheat starch | — | 50 | — | — |
| Dextrose | — | — | — | 50 |
| Glucose | — | 50 | — | — |
| Fructose | — | — | 50 | — |
| Modified starch* | 50 | — | — | — |
| Corn syrup | 60 | — | — | — |
| Molasses | — | — | 50 | 100 |
| Black liquor | — | 100 | — | — |
| Sodium lignosulfonate | 100 | — | 150 | 100 |
| Water | 500 | 500 | 500 | 500 |
| Total | 1000 | 1000 | 1000 | 1000 |

*Starch which has been hydrolysed to give a lower molecular weight and, therefore, a low viscosity The above mentioned samples were prepared by plain mixing at 40° to 50° C. until the solids were completely dissolved. The pH of the final products was adjusted to 8.5 to 10.0.

Glue formulations were then prepared as follows:

|  | Glue formulation No. | | | | |
| --- | --- | --- | --- | --- | --- |
|  | 0 | 1 | 2 | 3 | 4 |
|  |  | parts by weight | | | |
| Urea formaldehyde resin (65%) | 108.9 | 87.1 | 87.1 | 87.1 | 87.1 |
| Water | 13.8 | 13.8 | 13.8 | 13.8 | 13.8 |
| Sample 1 | — | 21.8 | — | — | — |
| Sample 2 | — | — | 21.8 | — | — |
| Sample 3 | — | — | — | 21.8 | — |
| Sample 4 | — | — | — | — | 21.8 |
| Ammonium chloride (20%) | 7.1 | 7.1 | 7.1 | 7.1 | 7.1 |

These glue formulations were used separately to spray a constant quantity of dried wood chips.

The sprayed wood chips were then formed into a mat having a nominal thickness of 16 mm. These mats were then introduced into a hot press and boards were pressed at the following conditions:

| Press temperature | 200° C. |
| --- | --- |
| Press time | 9 sec/mm |
| Pressure | 33 kp/cm² |

Boards were then tested and the results are reported in the following table:

|  | Glue formulation No. | | | | |
| --- | --- | --- | --- | --- | --- |
|  | 0 | 1 | 2 | 3 | 4 |
| Density (kg/m³) | 625 | 617 | 633 | 631 | 628 |
| Thickness (mm) | 15.9 | 15.8 | 16.0 | 16.2 | 16.0 |
| Internal bond (kg/cm²) | 7.0 | 6.9 | 7.1 | 7.2 | 6.8 |
| 2 hrs thickness swelling (%) | 12.5 | 12.1 | 13.6 | 13.1 | 12.6 |
| 24 hrs thickness swelling (%) | 22.5 | 20.7 | 24.7 | 24.0 | 20.9 |
| Free formaldehyde (mg/100 g dry board) | 28.8 | 22.5 | 21.7 | 23.0 | 21.9 |
| Moisture content (%) | 6.1 | 5.7 | 5.9 | 5.9 | 6.2 |

It can be noticed from the above mentioned table that samples 1 to 4 including the substitute according to the present invention give boards equivalent to the blank, sample 0, while giving a significant free formaldehyde reduction and resin saving.

EXAMPLE 8

Three samples were prepared according to the following formulations:

|  | Sample No. | | |
| --- | --- | --- | --- |
|  | 1 | 2 | 3 |
|  |  | parts by weight | |
| Formaldehyde 100% | 135 | 135 | 135 |
| Urea 100% | 365 | 365 | 365 |
| Sucrose 100% | 10 | — | — |
| Molasses 100% | — | 10 | — |
| Calcium lignosulfonate (100%) | — | — | 10 |
| Water | 490 | 490 | 490 |
| Total | 1000 | 1000 | 1000 |

The above mentioned samples were prepared by plain mixing at 25° to 30° C. until the solids were completely dissolved. The pH of the final products was adjusted to 8.5 to 10.0.

Glue formulations were then prepared as follows:

|  | Glue formulation No. | | | |
| --- | --- | --- | --- | --- |
|  | 0 | 1 | 2 | 3 |
|  | parts by weight | | | |
| Urea formaldehyde Resin (65% solids) | 108.9 | 95.9 | 95.9 | 95.9 |
| Water | 13.8 | 13.8 | 13.8 | 13.8 |
| Sample 1 | — | 13 | — | — |
| Sample 2 | — | — | 13 | — |
| Sample 3 | — | — | — | 13 |
| Ammonium chloride (20% solution in water) | 7.1 | 7.1 | 7.1 | 7.1 |

These glue formulations were used separately to spray a constant quantity of dried wood chips.

The sprayed wood chips were then formed into a mat having a nominal thickness of 16 mm. These mats were then introduced into a hot press and boards were pressed at the following conditions:

| Press temperature | 200° C. |
| --- | --- |
| Press time | 8 sec/mm |
| Pressure | 35 kp/cm² |

Boards were then tested and the results are reported in the following table:

|  | Glue formulation No. | | | |
| --- | --- | --- | --- | --- |
|  | 0 | 1 | 2 | 3 |
| Density (kg/m³) | 575 | 582 | 579 | 601 |
| Thickness (mm) | 15.4 | 15.3 | 15.5 | 15.4 |
| Internal bond (kg/cm²) | 8.3 | 8.7 | 8.9 | 9.5 |
| 2 hrs thickness swelling (%) | 10.3 | 10.8 | 10.6 | 11.1 |
| 24 hrs thickness swelling (%) | 20.2 | 21.3 | 20.9 | 21.9 |
| Free formaldehyde (mg/100 g dry board) | 60.5 | 39.8 | 41.3 | 38.1 |
| Moisture content (%) | 6.0 | 7.1 | 6.8 | 6.5 |

Boards obtained with all glue formulations are equivalent. Those however that include the substitute according to the present invention have lower free formaldehyde.

EXAMPLE 9

Three samples were prepared according to the following formulations:

|  | Sample No. | | |
| --- | --- | --- | --- |
|  | 1 | 2 | 3 |
|  | parts by weight | | |
| Formaldehyde 100% | 85 | 85 | 85 |
| Urea 100% | 400 | 400 | 400 |
| Sucrose 100% | 32.3 | — | — |
| Molasses 100% | — | 32.3 | — |
| Calcium lignosulfonate (100%) | — | — | 32.3 |
| Water | 482.7 | 482.7 | 482.7 |
| Total | 1000 | 1000 | 1000 |

The above mentioned samples were prepared by plain mixing at 25° to 30° C. until the solids were completely dissolved. The pH of the final products was adjusted to 8.5 to 10.0.

Glue formulations were then prepared as follows:

|  | Glue formulation No. | | | |
| --- | --- | --- | --- | --- |
|  | 0 | 1 | 2 | 3 |
|  | parts by weight | | | |
| Urea formaldehyde Resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20% solution in water) | 7.1 | 7.1 | 7.1 | 7.1 |

These glue formulations were used separately to spray a constant quantity of dried wood chips.

The sprayed wood chips were then formed into a mat having a nominal thickness of 16 mm. These mats were then introduced into a hot press and boards were pressed at the following conditions:

| Press temperature | 200° C. |
| --- | --- |
| Press time | 8 sec/mm |
| Pressure | 35 kp/cm² |

Boards were then tested and the results are reported in the following table:

|  | Glue formulation No. | | | |
| --- | --- | --- | --- | --- |
|  | 0 | 1 | 2 | 3 |
| Density (kg/m³) | 610 | 590 | 597 | 615 |
| Thickness (mm) | 15.9 | 15.7 | 15.6 | 15.9 |
| internal bond (kg/cm²) | 7.9 | 8.1 | 8.3 | 8.4 |
| 2 hrs thickness swelling (%) | 9.8 | 10.2 | 10.5 | 10.9 |
| 24 hrs thickness swelling (%) | 20.1 | 21.3 | 20.9 | 21.8 |
| Free formaldehyde (mg/100 g dry board) | 40.1 | 15.3 | 17.1 | 16.3 |
| Moisture content (%) | 7.9 | 7.1 | 7.6 | 8.0 |

Boards obtained with all glue formulations are equivalent. Those however that include the substitute according to the present invention have a very big formaldehyde reduction and resin cost saving.

We claim:

1. A lignocellulosic product comprising in combination:
   (a) a bonding composition consisting essentially of:
      (1) a bonding resin; and
      (2) a resin substitute comprising an aqueous solution of:
         (i) at least one aldehyde selected from the group consisting of formaldehyde and acetaldehyde;
         (ii) at least one amide selected from the group consisting of urea, thiourea, melamine, benzoguanamine and dicyandiamide; and
         (iii) at least one carbohydrate member, selected from the group consisting of molasses, dextrose, glucose, fructose, sucrose, corn syrup, wheat starch, modified starch, dextrin, and their derivatives,
      wherein the ratio by weight of said aldehyde to said amide is 0.2 to 1:1; and
   (b) a lignocellulosic substrate.

2. The lignocellulosic product of claim 1 wherein said resin substitute comprises 40 to 52% water by weight, and the ratio of the combined weight of said aldehyde and said amides to the weight of said carbohydrate member is 1.0 to 15.0:1.

3. A lignocellulosic product comprising in combination:
   (a) a bonding composition consisting essentially of:
      (1) a bonding resin; and
      (2) a resin substitute comprising an aqueous solution of:
         (i) at least one non-resinous condensation product of formaldehyde and urea; and
         (ii) at least one carbohydrate member, selected from the group consisting of molasses, dextrose, glucose, fructose, sucrose, corn syrup, wheat starch, modified starch, dextrin, and their derivatives; and
   (b) a lignocellulosic substrate.

4. The lignocellulosic product of claim 3 wherein said resin substitute is 40 to 52% water by weight, and the ratio by weight of said non-resinous condensation product to said carbohydrate member is 1.0 to 15.0:1.

5. A method for bonding lignocellulosic particles which comprise the steps of:
   (a) providing a bonding composition consisting essentially of:
      (1) a bonding resin; and
      (2) a resin substitute comprising an aqueous solution of at lest one aldehyde selected from the group consisting of formaldehyde and acetaldehyde; at least one amide selected from the group consisting of urea, thiourea, melamine, benzoguanamine or dicyandiamide; at least one carbohydrate member selected from the group consisting of molasses, dextrose, glucose, fructose, sucrose, corn syrup, wheat starch, modified starch, dextrin, and their derivatives wherein said bonding composition is 40 to 52% water by weight, and the ratio of the combined weight of said aldehyde and said amide to the weight of said carbohydrate member is 1.0 to 15.0:1;
   (b) providing a lignocellulosic substrate;
   (c) combining said bonding composition with said lignocellulosic substrate; and
   (d) curing said combined materials at elevated temperatures and pressures adequate to bond the lignocellulosic particles together.

6. A process for bonding lignocellulosic particles which comprise the steps of:
   (a) providing a bonding composition consisting essentially of:
      (1) a bonding resin; and
      (2) a resin substitute comprising an aqueous solution of at least one non-resinous condensation product of formaldehyde and urea; and at least one carbohydrate member selected from the group consisting of molasses, dextrose, glucose, fructose, sucrose, corn syrup, wheat starch, modified starch, dextrin, and their derivatives wherein said bonding composition is 40 to 52% water by weight and the ratio of said non-resinous condensation product to said carbohydrate member is 1.0 to 15.0:1;
   (b) providing a lignocellulosic substrate;
   (c) combining said bonding composition and said lignocellulosic substrate; and
   (d) curing said combined materials at elevate pressures and temperature adequate to bond the lignocellulosic products together.

* * * * *

UNITED STATES PATENT AND TRADEMARK OFFICE
CERTIFICATE OF CORRECTION

PATENT NO. : 4,886,854

DATED : Dec. 12, 1989

INVENTOR(S) : Efthalia V. Markessini and Andrew C. Markessini

It is certified that error appears in the above-identified patent and that said Letters Patent is hereby corrected as shown below:

The title page and columns 1 - 14, should be deleted and substitute therefor the title page and columns 1 - 14, as shown on the attached pages.

Signed and Sealed this

Twentieth Day of August, 1991

*Attest:*

HARRY F. MANBECK, JR.

*Attesting Officer*   *Commissioner of Patents and Trademarks*

United States Patent [19]

Markessini et al.

[11] Patent Number: 4,886,854

[45] Date of Patent: Dec. 12, 1989

[54] SUBSTITUTE FOR AMINO AND PHENOLIC RESINS

[75] Inventors: Efthalia V. Markessini, Salonica, Greece; Andrew C. Markessini, Bad Munder, Fed. Rep. of Germany

[73] Assignee: ENIGMA, NV, Curacao, Netherlands Antilles

[21] Appl. No.: 58,905

[22] Filed: Jun. 5, 1987

[30] Foreign Application Priority Data

Jun. 6, 1986 [GB] United Kingdom ............... 8613791
Jan. 23, 1987 [GB] United Kingdom ............... 8701518
Apr. 28, 1987 [GB] United Kingdom ............... 8710016

[51] Int. Cl.$^4$ .......................... C08L 97/02; B29J 5/00
[52] U.S. Cl. ..................................... 524/14; 524/13; 428/537.1
[58] Field of Search .................. 524/27, 33, 34, 47, 524/48, 49, 50, 51, 55, 56, 57, 58, 72, 74, 13, 14; 428/537.1

[56] References Cited

U.S. PATENT DOCUMENTS 4,339,361 7/1982 MacPherson et al. ............. 527/303

FOREIGN PATENT DOCUMENTS

| 0041745 | 12/1981 | Italy |
| 506553 | 5/1939 | United Kingdom |
| 624437 | 6/1946 | United Kingdom |
| 634368 | 3/1950 | United Kingdom |
| 824108 | 11/1959 | United Kingdom |
| 929004 | 6/1963 | United Kingdom |
| 963462 | 7/1964 | United Kingdom |
| 1038077 | 8/1966 | United Kingdom |
| 1293744 | 10/1972 | United Kingdom |
| 1309606 | 3/1973 | United Kingdom |
| 1601751 | 11/1981 | United Kingdom |
| 2136008A | 9/1984 | United Kingdom |

Primary Examiner—Morton Foelak
Assistant Examiner—Nathan M. Nutter
Attorney, Agent, or Firm—Limbach, Limbach & Sutton

[57] ABSTRACT

A composition of matter is disclosed which substitutes for amino and phenolic resins in binding lignocellulosic particles. More specifically, the composition is used in the polycondensation of amino and phenolic resins based on formaldehyde with water-penetrable lignocellulosic particles. The substitutes are aqueous solutions. First, an aldehyde and amide are combined with either a carbohydrate, lignosulfonate or both. The second compound is an aldehyde and phenolic member combined with either a carbohydrate, lignosulfonate or both. The third composition comprises a non-resinous condensation product of urea and formaldehyde and either a carbohydrate, lignosulfonate or both.

6 Claims, No Drawings

500
SUBSTITUTE FOR AMINO AND PHENOLIC RESINS

TECHNICAL FIELD

This invention relates generally to the bonding of lignocellulosic products, and more specifically to the use of substitutes for amino and phenolic resins currently employed for such bonding.

BACKGROUND OF THE INVENTION

Particle board, plywood and veneers currently involve the combination of amino and phenolic resins with underlying lignocellulosic components. The use of amino and phenolic resins in wood products requires high temperatures to treat the final product and to cure the resins, resulting in potential hazards to the environment and in the workplace. Furthermore, the presence of these resins in waste wood products makes disposal by incineration difficult without further mechanical and environmental hazard. In view of these shortcomings, there has been an ongoing search for a substitute which is less hazardous but which retains the desirable properties of amino and phenolic resins.

To avoid the environmental hazards described above, both the amount of resin used and the amount of free formaldehyde produced must be reduced in the bonding and curing process. Currently known substitute resins have failed because their use in such quantities imparts a loss in bonding strength, changes the curing rate of the production, causes problems to boilers when burning particleboard waste, and reduces the tack of the resin mixture.

Known substituents include lignosulfonates, sodium chloride, or mixtures of formaldehyde with urea and sodium chloride. It is well known, for instance, that the proportion of lignosulfonates to wood may not be greater than 10% without a concomitant reduction in board quality. The substitution of resin with a halide salt is unsatisfactory, since substitutions higher than 6 to 8% result in a loss of board quality. Such substitution also results in a reduction of tack, making difficult the production of plywood and particleboard. Further, such substitution yields wood products which plug boilers when burned because the halide salt of the substitution reduces the melting point of the resin mixture which, when molten, produces a sticky, glass-like deposit. Finally, mixtures of sodium chloride with urea and formaldehyde are similarly problematic in that they suffer from the above tacking and boiler-plugging problems.

The present invention overcomes all of the above shortcomings and, in addition, improves the working environment by reducing the amount of free formaldehyde produced.

A principal object of the present invention therefore is to provide a substitute for amino and phenolic resins that when used with lesser amounts of said resins will maintain the desirable properties of wood products produced with resins alone.

Another object of the invention is to provide a substitute for amino and phenolic resins that will not lower the melting point of said resins when combined with said substitute.

A further object of the invention is to provide a substitute for amino and phenolic resins that will, when combined with the partially replacing said resins, reduce the amount of formaldehyde generated during the production of wood products.

SUMMARY OF THE INVENTION

The present invention comprises the combination in aqueous solution of an aldehyde and amide with a carbohydrate or lignosulfonate, or both. An alternate bonding composition comprises an aldehyde and a phenolic member with a carbohydrate or lignosulfonate or both. Alternatively, a non-resinous condensation product of formaldehyde and urea with a carbohydrate or lignosulfonate, or both, may be used. Such compounds provide a substitute for and partially replaces amino and phenolic resins in the polycondensation of such resins with lignocellulosic components.

The resin substitute can be prepared by plain mixing of the components. In order to obtain an acceptable shelf-life of the substitute, a base is preferably added to adjust the pH to a value in the range of 6 to 14.

Bonding is effectuated by curing the resin mixture at elevated temperatures and pressures according to methods well known in the Art. The substitute may be used in all types of products where amino and phenolic resins are used for bonding lignocellulosic products, whether these are wood particles for particleboard production using a flat press, or a calender or wood veneers such as in plywood production.

Use of the resin substitute yields a product with good tack. This property, otherwise called "green strength", is desired especially in those particleboard plants that utilize multi-opening presses, and in those plywood factories that employ a pre-press.

The quality of boards produced with resin substitutes according to the present invention were observed weekly for a period of six months. No deterioration of these boards was observed, thus demonstrating that polymer degradation had not occurred and that the aging properties of the boards are comparable to the ones currently produced with resins alone.

DESCRIPTION OF THE PREFERRED EMBODIMENT

The resin substitutes of the present invention comprise aqueous solutions of either:

1. at least one aldehyde, at least one amide, and either a carbohydrate member or a lignosulfonate member, or both;
2. at least one aldehyde, at least one phenolic member and either a carbohydrate, or a lignosulfonate member, or both;
3. at least one non-resinous condensation product of urea and formaldehyde and either a carbohydrate member, or a lignosulfonate member, or both.

The aldehyde is preferably formaldehyde or acetaldehyde. The amide is preferably urea, thiourea or their homologues but may also be melamine, benzoguanamine, dicyandiamide or their homologues. The phenolic member is preferably phenol or resorcinol.

The carbohydrate member can be either a sugar or starch. Among the sugars, their derivatives and by-products, molasses, dextrose, glucose, fructose or sucrose, or mixtures thereof, such as corn syrup, are most preferred. Among the starches, wheat starch, modified starches, and dextrin may be used.

Suitable lignosulfonate members include black liquor as well as sodium, calcium and ammonium lignosulfonate.

The above compounds are plain mixed in aqueous solution which is preferably 40 to 52% water by weight.

In the case of substitute No. 1, the ratio of the combined weight of the aldehyde and the amide to the combined weight of the carbohydrate and lignosulfonate members may be 0.1 to 50.0:1, but is most preferably 1.0 to 15.0:1.

In the case of substitute No. 2, also in aqueous solution, preferably 40 to 52% water by weight, the ratio of the combined weight of the aldehyde and the phenolic member to the lignosulfonate member may be 0.1 to 50.0:1, but is most preferably 1.0 to 15.0:1.

In the case of substitute No. 3, also in aqueous solution, preferably 40 to 52% water by weight, the ratio of the weight of the non-resinous condensation product to the combined weight of the carbohydrate and lignosulfonate members may be 0.1 to 50.0:1, but is most preferably 1.0 to 15.0:1.

If only a single component is added to the resin, no advantage obtains.

The resin substitute of the present invention may replace as much as 30% of the resin. Said substitute does not replace the resin in a 1:1 ratio, however. Rather, an amount of the resin substitute, calculated by weight in anhydrous form, is added in an amount equivalent to 50-90% of the resin replaced.

Because of its synergistic behavior, the resin substitute herein may replace the resin in quantities from 110% up to 200% of its own weight. When added in amounts less than 15%, there is a considerable increase in the product quality over the use of resins alone. When added in higher amounts, i.e., up to 30%, the quality of the end product is no different than if resins alone had been used. However, an advantageous result of replacement at the higher levels includes a sharp reduction in the formation of free formaldehyde.

The following examples illustrate the invention described above.

EXAMPLE 1

Three samples were prepared as follows:

|  | Sample No. | | |
|---|---|---|---|
|  | 1 | 2 | 3 |
|  | parts by weight | | |
| Formaldehyde 100% | 185 | — | 133 |
| Urea 100% | 370 | — | 266 |
| Molasses 100% | — | 555 | 156 |
| Water | 445 | 445 | 445 |
| Total | 1000 | 1000 | 1000 |

These were prepared by plain mixing at room temperature until the solids were completely dissolved. The pH of the final products was adjusted to 7.5 to 8.0.

Glue formulations were then prepared as follows:

|  | Glue formulation No. | | | |
|---|---|---|---|---|
|  | 0 | 1 | 2 | 3 |
|  | parts by weight | | | |
| Urea formaldehyde resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20%) | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 9 sec/mm under a pressure of 33 kp/cm².

Boards were then tested, with the following results:

| Glue Formulation No. | 0 | 1 | 2 | 3 |
|---|---|---|---|---|
| Density (kg/m³) | 582 | 591 | 583 | 582 |
| Thickness (mm) | 15.4 | 15.2 | 15.5 | 15.4 |
| Internal Bond (kg/cm²) | 7.1 | 6.5 | 5.0 | 7.2 |
| 2 hrs thickness swelling (%) | 11.1 | 11.3 | 17.5 | 12.1 |
| 24 hrs thickness swelling (%) | 20.3 | 22.5 | 30.3 | 22.3 |
| Free formaldehyde (mg/100 g dry board) | 24.1 | 18.3 | 21.8 | 18.7 |
| Moisture content (%) | 5.5 | 5.0 | 5.3 | 5.0 |

Note that while all three samples reduce the free formaldehyde of boards, only the resin substitute of the present invention in sample 3 yields boards equivalent in quality to boards produced with resins alone.

EXAMPLE 2

This example demonstrates the synergistic behavior of between formaldehyde, urea and lignosulfonates in combination. The following samples were prepared:

|  | Sample No. | | |
|---|---|---|---|
|  | 1 | 2 | 3 |
|  | parts by weight | | |
| Formaldehyde (100%) | 100 | — | 133 |
| Urea (100%) | 370 | — | 266 |
| Calcium lignosulfonate (100%) | — | 555 | 156 |
| Water | 445 | 445 | 445 |
| Total | 1000 | 1000 | 1000 |

The samples were prepared by plain mixing at room temperature until the solids were completely dissolved. The pH of the final products was adjusted to 7.5 to 8.0.

Glue formulations were then prepared as follows:

|  | Glue formulation No. | | | |
|---|---|---|---|---|
|  | 0 | 1 | 2 | 3 |
|  | parts by weight | | | |
| Urea formaldehyde resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20%) | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 9 sec/mm at a pressure of 33 kp/cm².

Boards were then tested, with the following results:

| Glue formulation No. | 0 | 1 | 2 | 3 |
|---|---|---|---|---|
| Density (kg/m³) | 580 | 591 | 590 | 584 |
| Thickness (mm) | 15.5 | 15.2 | 15.0 | 15.1 |
| Internal bond (kg/cm²) | 7.0 | 6.3 | 5.4 | 6.9 |
| 2 hrs thickness swelling (%) | 11.2 | 11.3 | 17.8 | 11.8 |
| 24 hrs thickness | 20.6 | 22.5 | 29.5 | 23.8 |

| Glue formulation No. | 0 | 1 | 2 | 3 |
|---|---|---|---|---|
| swelling (%) | | | | |
| Free formaldehyde (mg/100 g dry board) | 23.9 | 19.8 | 18.5 | 17.8 |
| Moisture content (%) | 5.8 | 5.0 | 4.5 | 4.8 |

The boards produced with plain lignosulfonates in sample 2 display the worst results. Boards produced with the resin substitute of the present invention, as shown in sample 3, yielded the best results, and were equivalent to boards produced with resins alone, as shown in sample 0. Most importantly, boards using sample three were produced with a marked reduction in free formaldehyde as compared the pure resin production of sample 0.

EXAMPLE 3

This example illustrates how the quantities of the components of the resin substitute of the present invention may be varied without a loss in product quality. The following samples were prepared:

| | Sample No. | |
|---|---|---|
| | 1 | 2 |
| | parts by weight | |
| Formaldehyde (100%) | 133 | 133 |
| Urea (100%) | 177 | 177 |
| Molasses (100%) | 156 | — |
| Dextrin glue (100%) | 30 | — |
| Calcium lignosulfonate (100%) | — | 186 |
| Water | 504 | 504 |
| Total | 1000 | 1000 |

The samples were prepared by plain mixing at room temperature until the solids were completely dissolved. The pH of the final products was adjusted to 7.5 to 8.0.

Glue formulations were then prepared as follows:

| | Glue formulation No. | | |
|---|---|---|---|
| | 0 | 1 | 2 |
| | parts by weight | | |
| Urea formaldehyde resin (65% solids) | 108.9 | 87.1 | 87.1 |
| Water | 13.8 | 13.8 | 13.8 |
| Sample 1 | — | 21.8 | — |
| Sample 2 | — | — | 21.8 |
| Ammonium chloride (20%) | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 9 sec/mm under a pressure of 33 kp/cm².

Boards were then tested, with the following results:

| Glue formulation No. | 0 | 1 | 2 |
|---|---|---|---|
| Density (kg/m³) | 573 | 595 | 587 |
| Thickness (mm) | 15.1 | 15.4 | 15.2 |
| Internal bond (kg/cm²) | 8.1 | 8.7 | 8.9 |
| 2 hrs thickness swelling (%) | 10.5 | 10.0 | 9.8 |
| 24 hrs thickness swelling (%) | 19.9 | 19.3 | 18.7 |
| Free formaldehyde (mg/100 g dry board) | 46.6 | 39.2 | 34.3 |
| content (%) | 5.9 | 5.3 | 5.0 |

Note that the resin substitute of the present invention, as shown in samples 1 and 2, gives boards equivalent in quality and strength to boards prepared only with resin, as shown in sample 0, while also giving a significant reduction in free formaldehyde.

EXAMPLE 4

This example demonstrates the use of phenolics in the resin substitute of the present invention.

The following samples were prepared:

| | Sample No. | |
|---|---|---|
| | 1 | 2 |
| | parts by weight | |
| Phenol (100%) | 180 | 200 |
| Formaldehyde (100%) | 80 | 100 |
| Molasses (100%) | 120 | 180 |
| Ammonium lignosulfonate (100%) | 200 | — |
| Water | 420 | 520 |
| Total | 1000 | 1000 |

The samples were prepared by plain mixing at room temperature until the solids were completely dissolved. The pH of the final products was adjusted to a level of 10.0 by the addition of an appropriate amount of sodium hydroxide.

These samples were used in a glue formulation as follows:

| | Glue formulation No. | | |
|---|---|---|---|
| | 0 | 1 | 2 |
| | parts by weight | | |
| Phenol formaldehyde glue (100%) | 100 | 80 | 80 |
| Hardener (calcium carbonate: wheat flour - weight ratio 50:50) | 60 | 60 | 60 |
| Water | 107 | 90 | 90 |
| Sample 1 | — | 30.77 | — |
| Sample 2 | — | — | 30.77 |
| Wheat flour | — | — | 10 |
| Total | 267 | 260.77 | 270.77 |
| Viscosity (mPa · s) | 1200 | 1300 | 1100 |

The glue formulations above were applied to both sides of the core veneer for 3 ply boards. Boards were then introduced in a cold press where they were pressed for 8 minutes under a pressure of 10 kp/cm². After the cold press, all boards demonstrated very good tack properties.

These boards were then pressed in a hot press at 130° C. for 3.5 minutes under a pressure of 12 kp/cm². After such treatment, the boards were immersed in water at 60° C. for a period of 24 hours. Afterwards, they were immersed in water a second time 20° C. for one hour.

The twice immersed boards were then "knife tested" by placing the boards in water under pressure for 30 minutes and then in vacuum for another 30 minutes. The boards were then scraped with a knife on the surface until the top veneer comes off and the core shows up. Grading depends on the amount of fibers showing in the core after the top veneer was scraped off. When gluing is satisfactory, the scraped must still be covered with fibers. When completely covered with fibers, bonding is considered excellent and the board is rated 10. As fiberless spots increase in number and area, board grade diminishes. A rating of 8, indicating that the surface has only a few fiberless spots, is satisfactory. Lower grade boards are unsatisfactory.

Results were as follows:

| Glue formulation No. | 0 | 1 | 2 |
|---|---|---|---|
| Grading | 10/10 | 10/10 | 10/10 |

EXAMPLE 5

Two samples were prepared as follows:

| | Sample No. | |
|---|---|---|
| | 1 | 2 |
| | parts by weight | |
| Formaldehyde (100%) | 100 | 140 |
| Urea (100%) | 140 | 190 |
| Melamine (100%) | 100 | 110 |
| Molasses (100%) | — | 110 |
| Ammonium lignosulfonate (100%) | 150 | — |
| Water | 510 | 450 |
| Total | 1000 | 1000 |

The samples were prepared by plain mixing at 25° to 30° C. until the solids were completely dissolved. The pH of the final products was adjusted to 8.5 to 10.0.

Glue formulations were then prepared as follows:

| | Glue formulation No. | | |
|---|---|---|---|
| | 0 | 1 | 2 |
| | parts by weight | | |
| Kauramin 535 (63% solids) | 108 92 | 92 | |
| Hardener (consisting of by weight hot water, 462; urea, 384; ammonium chloride 154, for a total weight of 1,000) | 14.8 | 14.8 | 14.8 |
| Formic acid (20%) | 4 | 4 | 4 |
| Paraffin emulsion | 5.5 | 5.5 | 5.5 |
| Sample 1 | — | 16 | — |
| Sample 2 | — | — | 16 |
| Water | 13 | 13 | 13 |

Each glue formulation was applied separately to a constant quantity of dried wood chips with 12% dry glue/dry wood. The treated wood chips were then formed into a mat having a normal thickness of 16 mm. These mats were then introduced into a hot press, with boards were pressed at 200° C. for 10 sec/mm under a pressure of 35 kp/cm².

Boards were then tested, with the following results:

| Glue Formulation No. | 0 | 1 | 2 |
|---|---|---|---|
| Density (kg/m³) | 686 | 687 | 685 |
| Thickness (mm) | 15.9 | 15.7 | 15.7 |
| Internal Bond (kg/cm²) | 6.6 | 6.5 | 6.4 |
| 2 Hrs Thickness Swelling (%) | 3.2 | 3.2 | 2.9 |
| 24 Hrs Thickness Swelling (%) | 9.2 | 9.0 | 8.5 |

The boards were further tested for internal bonding strength. The standard test for such strength is the V-100 test. This test is carried out by placing sample boards in water at a temperature from 15° to 25° C. This water is warmed over 1 to 2 hours to 100° C. Water temperature is then maintained at 100° C. for 2 hours. A space of at least 15 mm on all sides of the sample boards as to insure the unimpeded introduction of water into the samples. The samples are then placed in a refrigerator at 15° to 25° C. for at least one hour. Water is then allowed to drip and the wet samples are tested again for internal bond.

Boards were then tested, with the following results

| Glue Formulation No. | 0 | 1 | 2 |
|---|---|---|---|
| V-100 (kg/cm²) | 1.6 | 1.5 | 1.6 |

EXAMPLE 6

This example further illustrates the variety of components that may be used to make the resin substitute of the present invention.

Samples were prepared as follows:

| | Sample No. | | |
|---|---|---|---|
| | 1 | 2 | 3 |
| | parts by weight | | |
| Paraformaldehyde | 350 | — | — |
| Precondensate (80%) (containing by weight, 53 parts formaldehyde, 27 parts urea, and 20 parts water) | — | 50 | — |
| Acetaldehyde (100%) | — | — | 130 |
| Urea (100%) | 150 | 12 | 200 |
| Sucrose (100%) | 50 | 100 | — |
| Molasses (100%) | 50 | 150 | — |
| Ammonium lignosulfonate (100%) | — | 230 | 210 |
| Dextrin (100%) | — | 40 | — |
| Water | 400 | 418 | 460 |

These samples were prepared by plain mixing until the solids were completely dissolved. The pH of the final products was adjusted to 7.5 to 8.0.

Glue formulations were then prepared as follows:

| | Glue Formulation No. | | | |
|---|---|---|---|---|
| | 0 | 1 | 2 | 3 |
| | parts by weight | | | |
| Urea formaldehyde resin (65% solids) | 108.9 | 93 | 93 | 93 |
| Water | 13.8 | 13.8 | 13.8 | 13.8 |
| Sample 1 | — | 15.9 | — | — |
| Sample 2 | — | — | 15.9 | — |
| Sample 3 | — | — | — | 15.9 |
| Ammonium chloride (20%) | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 9 sec/mm under a pressure of 33 kp/cm².

Boards were then tested, with the following results:

| | Glue formulation No. | | | |
|---|---|---|---|---|
| | 0 | 1 | 2 | 3 |
| | parts by weight | | | |
| Density (kg/m³) | 600 | 610 | 590 | 580 |
| Thickness (mm) | 15.8 | 15.9 | 15.7 | 15.6 |
| Internal bond (kg/cm²) | 6.8 | 6.9 | 7.1 | 6.5 |
| 2 hrs thickness swelling (%) | 10.5 | 10.3 | 10.1 | 9.9 |
| 24 hrs thickness swelling (%) | 20.1 | 19.5 | 19.9 | 20.3 |
| Free formaldehyde | 22.3 | 18.0 | 16.2 | 17.1 |
| Moisture content (%) | 5.7 | 5.3 | 5.5 | 5.6 |

Note that there is no appreciable difference in quality or properties between the boards prepared with each formulation above.

EXAMPLE 7

In this example, four samples were prepared as follows:

|  | Sample No. | | | |
|---|---|---|---|---|
|  | 1 | 2 | 3 | 4 |
|  | parts by weight | | | |
| Formaldehyde | 100 | 100 | 100 | 100 |
| Resorcinol | — | 50 | — | — |
| Thiourea | 50 | — | — | — |
| Urea | 140 | 150 | 70 | 70 |
| Benzoguanamine | — | — | 80 | — |
| Dicyandiamide | — | — | — | 80 |
| Wheat starch | — | 50 | — | — |
| Dextrose | — | — | — | 50 |
| Glucose | — | 50 | — | — |
| Fructose | — | — | 50 | — |
| Modified starch* | 50 | — | — | — |
| Corn syrup | 60 | — | — | — |
| Molasses | — | — | 50 | 100 |
| Black liquor | — | 100 | — | — |
| Sodium lignosulfonate | 100 | — | 150 | 100 |
| Water | 500 | 500 | 500 | 500 |
| Total | 1000 | 1000 | 1000 | 1000 |

*Starch which has been hydrolysed to give a lower molecular weight and, therefore, a low viscosity These samples were prepared by plain mixing at 40° to 50° C. until the solids were completely dissolved. The pH of the final products was adjusted to 8.5 to 10.0.

Glue formulations were then prepared as follows:

|  | Glue formulation No. | | | | |
|---|---|---|---|---|---|
|  | 0 | 1 | 2 | 3 | 4 |
|  | parts by weight | | | | |
| Urea formaldehyde resin (65%) | 108.9 | 87.1 | 87.1 | 87.1 | 87.1 |
| Water | 13.8 | 13.8 | 13.8 | 13.8 | 13.8 |
| Sample 1 | — | 21.8 | — | — | — |
| Sample 2 | — | — | 21.8 | — | — |
| Sample 3 | — | — | — | 21.8 | — |
| Sample 4 | — | — | — | — | 21.8 |
| Ammonium chloride (20%) | 7.1 | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 9 sec/mm at a pressure of 33 kp/cm².

Boards were then tested, with results as follows:

|  | Glue formulation No. | | | | |
|---|---|---|---|---|---|
|  | 0 | 1 | 2 | 3 | 4 |
|  | parts by weight | | | | |
| Density (kg/m³) | 625 | 617 | 633 | 631 | 628 |
| Thickness (mm) | 15.9 | 15.8 | 16.0 | 16.2 | 16.0 |
| Internal bond (kg/cm²) | 7.0 | 6.9 | 7.1 | 7.2 | 6.8 |
| 2 hrs thickness swelling (%) | 12.5 | 12.1 | 13.6 | 13.1 | 12.6 |
| 24 hrs thickness swelling (%) | 22.5 | 20.7 | 24.7 | 24.0 | 20.9 |
| Free formaldehyde (mg/100 g dry board) | 28.8 | 22.5 | 21.7 | 23.0 | 21.9 |
| Moisture content (%) | 6.1 | 5.7 | 5.9 | 5.9 | 6.2 |

Note that samples 1 to 4, each using the resin substitute of the present invention, yield boards of equivalent quality to and with less free formaldehyde than boards produced with resins alone.

EXAMPLE 8

Three samples were prepared as follows:

|  | Sample No. | | |
|---|---|---|---|
|  | 1 | 2 | 3 |
|  | parts by weight | | |
| Formaldehyde (100%) | 135 | 135 | 135 |
| Urea (100%) | 365 | 365 | 365 |
| Sucrose (100%) | 10 | — | — |
| Molasses (100%) | — | 10 | — |
| Calcium lignosulfonate (100%) | — | — | 10 |
| Water | 490 | 490 | 490 |
| Total | 1000 | 1000 | 1000 |

These samples were prepared by plain mixing at 25° to 30° C. until the solids were completely dissolved. The pH of the final products was adjusted to 8.5 to 10.0.

Glue formulations were then prepared as follows:

|  | Glue formulation No. | | | |
|---|---|---|---|---|
|  | 0 | 1 | 2 | 3 |
|  | parts by weight | | | |
| Urea formaldehyde Resin (65% solids) | 108.9 | 95.9 | 95.9 | 95.9 |
| Water | 13.8 | 13.8 | 13.8 | 13.8 |
| Sample 1 | — | 13 | — | — |
| Sample 2 | — | — | 13 | — |
| Sample 3 | — | — | — | 13 |
| Ammonium chloride (20% solution in water) | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 8 sec/mm under a pressure of 35 kp/cm².

Boards were then tested, with result as follows:

| Glue formulation No. | 0 | 1 | 2 | 3 |
|---|---|---|---|---|
| Density (kg/m³) | 575 | 582 | 579 | 601 |
| Thickness (mm) | 15.4 | 15.3 | 15.5 | 15.4 |
| Internal bond (kg/cm²) | 8.3 | 8.7 | 8.9 | 9.5 |
| 2 hrs thickness swelling (%) | 10.3 | 10.8 | 10.6 | 11.1 |
| 24 hrs thickness swelling (%) | 20.2 | 21.3 | 20.9 | 21.9 |
| Free formaldehyde (mg/100 g dry board) | 60.5 | 39.8 | 41.3 | 38.1 |
| Moisture content (%) | 6.0 | 7.1 | 6.8 | 6.5 |

Boards obtained with each glue formulation are equivalent. Those that include the resin substitute of the present invention have lower free formaldehyde.

EXAMPLE 9

Three samples were as follows:

|  | Sample No. | | |
|---|---|---|---|
|  | 1 | 2 | 3 |
|  | parts by weight | | |
| Formaldehyde (100%) | 85 | 85 | 85 |
| Urea (100%) | 400 | 400 | 400 |

-continued

|  | Sample No. | | |
|---|---|---|---|
|  | 1 | 2 | 3 |
|  | parts by weight | | |
| Sucrose (100%) | 32.3 | — | — |
| Molasses (100%) | — | 32.3 | — |
| Calcium lignosulfonate (100%) | — | — | 32.3 |
| Water | 482.7 | 482.7 | 482.7 |
| Total | 1000 | 1000 | 1000 |

These samples were prepared by plain mixing at 25° to 30° C. until the solids were completely dissolved. The pH of the final products was adjusted to 8.5 to 10.0. Glue formulations were then prepared as follows:

|  | Glue formulation No. | | | |
|---|---|---|---|---|
|  | 0 | 1 | 2 | 3 |
|  | parts by weight | | | |
| Urea formaldehyde Resin (65% solids) | 108.9 | 81.7 | 81.7 | 81.7 |
| Water | 13.8 | 13.8 | 13.8 | 13.8 |
| Sample 1 | — | 27.2 | — | — |
| Sample 2 | — | — | 27.2 | — |
| Sample 3 | — | — | — | 27.2 |
| Ammonium chloride (20% solution in water) | 7.1 | 7.1 | 7.1 | 7.1 |

Each glue formulation was separately applied to a constant quantity of dried wood chips. The treated wood chips were then formed into a mat having a nominal thickness of 16 mm. These mats were then introduced into a hot press and boards were pressed at 200° C. for 8 sec/mm under a pressure 35 kp/cm$^2$.

Boards were then tested, with results as follows:

| Glue formulation No. | 0 | 1 | 2 | 3 |
|---|---|---|---|---|
| Density (kg/m$^3$) | 610 | 590 | 597 | 615 |
| Thickness (mm) | 15.9 | 15.7 | 15.6 | 15.9 |
| Internal bond (kg/cm$^2$) | 7.9 | 8.1 | 8.3 | 8.4 |
| 2 hrs thickness swelling (%) | 9.8 | 10.2 | 10.5 | 10.9 |
| 24 hrs thickness swelling (%) | 20.1 | 21.3 | 20.9 | 21.8 |
| Free formaldehyde (mg/100 g dry board) | 40.1 | 15.3 | 17.1 | 16.3 |
| Moisture content (%) | 7.9 | 7.1 | 7.6 | 8.0 |

There is no appreciable difference in quality or property between the boards obtained with the resin substitute and the boards obtained with resins alone. Note however the production of boards with the resin substitute evolved considerably less free formaldehyde than with resin alone.

Conclusion

From the foregoing description and examples, it is apparent that the invention enables the attainment of the objects initially set forth herein. In particular, it provides a compound and method for partially substituting resins in the polycondensation of such resins with lignocellulosic matter whereby the qualities of the finished product are maintained while reducing the amount of free formaldehyde evolved in the production process. It should be understood, however, that the invention is not intended to be limited by the preferred embodiments, but rather as defined by the accompanying claims.

We claim:

1. A lignocellulosic product comprising in combination:
   (a) a bonding composition consisting essentially of:
      (1) a bonding resin; and
      (2) a resin substitute comprising an aqueous solution of:
         (i) at least one aldehyde selected from the group consisting of formaldehyde and acetaldehyde;
         (ii) at least one amide selected from the group consisting of urea, thiourea, melamine, benzoguanamine and dicyandiamide; and
         (iii) at least one carbohydrate member, selected from the group consisting of molasses, dextrose, glucose, fructose, sucrose, corn syrup, wheat starch, modified starch, dextrin, and their derivatives,
      wherein the ratio by weight of said aldehyde to said amide is 0.2 to 1:1; and
   (b) a lignocellulosic substrate.

2. The lignocellulosic product of claim 1 wherein said resin substitute comprises 40 to 52% water by weight, and the ratio of the combined weight of said aldehyde and said amides to the weight of said carbohydrate member is 1.0 to 15.0:1.

3. A lignocellulosic product comprising in combination:
   (a) a bonding composition consisting essentially of:
      (1) a bonding resin; and
      (2) a resin substitute comprising an aqueous solution of:
         (i) at least one non-resinous condensation product of formaldehyde and urea; and
         (ii) at least one carbohydrate member, selected from the group consisting of molasses, dextrose, glucose, fructose, sucrose, corn syrup, wheat starch, modified starch, dextrin, and their derivatives; and
   (b) a lignocellulosic substrate.

4. The lignocellulosic product of claim 3 wherein said resin substitute is 40 to 52% water by weight, and the ratio by weight of said non-resinous condensation product to said carbohydrate member is 1.0 to 15.0:1.

5. A method for bonding lignocellulosic particles which comprise the steps of:
   (a) providing a bonding composition consisting essentially of:
      (1) a bonding resin; and
      (2) a resin substitute comprising an aqueous solution of at least one aldehyde selected from the group consisting of formaldehyde and acetaldehyde; at least one amide selected from the group consisting of urea, thiourea, melamine, benzoguanamine or dicyandiamide; at least one carbohydrate member selected from the group consisting of molasses, dextrose, glucose, fructose, sucrose, corn syrup, wheat starch, modified starch, dextrin, and their derivatives wherein said bonding composition is 40 to 52% water by weight, and the ratio of the combined weight of said aldehyde and said amide to the weight of said carbohydrate member is 1.0 to 15.0:1;
   (b) providing a lignocellulosic substrate;
   (c) combining said bonding composition with said lignocellulosic substrate; and
   (d) curing said combined materials at elevated temperatures and pressures adequate to bond the lignocellulosic particles together.

6. A process for bonding lignocellulosic particles which comprises the steps of:
 (a) providing a bonding composition consisting essentially of:
  (1) a bonding resin; and
  (2) a resin substitute comprising an aqueous solution of at least one non-resinous condensation product of formaldehyde and urea; and at least one carbohydrate member selected from the group consisting of molasses, dextrose, glucose, fructose, sucrose, corn syrup, wheat starch, modified starch, dextrin, and their derivatives wherein said bonding composition is 40 to 52% water by weight and the ratio of said non-resinous condensation product to said carbohydrate member is 1.0 to 15.0:1;
 (b) providing a lignocellulosic substrate;
 (c) combining said bonding composition and said lignocellulosic substrate; and
 (d) curing said combined materials at elevated pressures and temperatures adequate to bond the lignocellulosic products together.

* * * * *